Figure 1:
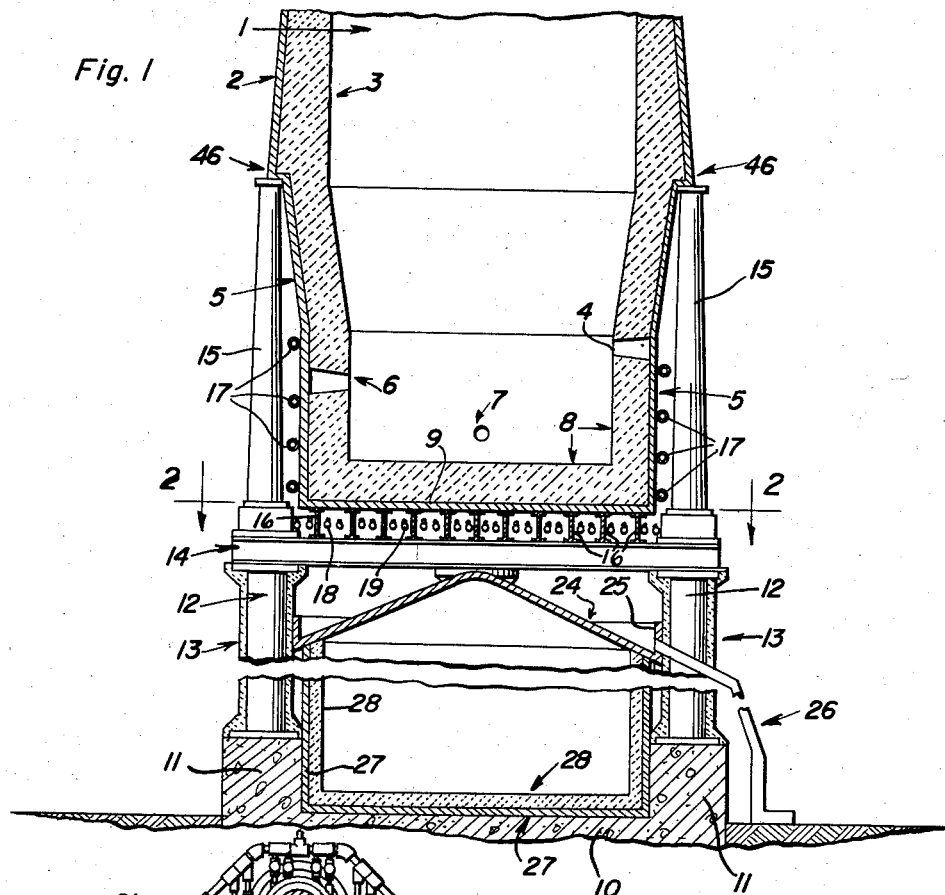

Nov. 4, 1958

E. B. SNYDER 2,859,030

BLAST FURNACE SPRAY COOLING
MEANS WITH DISPOSAL SHED

Filed Aug. 8, 1955

Ernest B. Snyder
INVENTOR

BY
ATTORNEY

United States Patent Office 2,859,030
Patented Nov. 4, 1958

2,859,030

BLAST FURNACE SPRAY COOLING MEANS WITH DISPOSAL SHED

Ernest B. Snyder, Steubenville, Ohio

Application August 8, 1955, Serial No. 526,966

9 Claims. (Cl. 266—32)

The present invention relates generally to metallurgical furnaces, and more particularly to blast furnaces used in the processing of iron ores to produce pig iron.

Such furnaces usually comprise a refractory brick shaft encased in a steel shell for receiving the charge of iron ore, coke and flux through its top. The inwardly sloping lower portion of the shaft, known as the bosh, is provided with peripherally disposed tuyeres for admission of a preheated blast of air which furnishes oxygen for burning the coke in the burden to produce carbon dioxide which in turn reacts with the coke to produce carbon monoxide to reduce the iron oxides of the ore to sponge iron. The heat from this reaction melts the sponge iron to molten iron.

Temperatures of 3500° F. are normally reached in front of the tuyeres. The molten iron in the bosh is approximately 2700° F., the melting point of iron being 2000° F. to 2100° F. Temperatures at the sides and bottom of the hearth, which is the lowermost portion of the furnace, are often higher than the melting point of iron, and it is not uncommon to run temperatures as high as 2700° F. and higher at the very bottom of the hearth.

It frequently happens that melted iron breaks out through the hearth and side wall of the furnace as a result of fusion and erosion caused by the high pressures and heat of the melted iron constantly contained therein. It has been found that the bosh wall and hearth burn out two or more times as rapidly as the main stack. The hearth burns and cuts away proportionately faster than the bosh wall.

In the past many attempts have been made to eliminate excessive furnace shut downs created by hearth failures resulting from excessive heating of the refractory materials or carbon forming the hearths. Among these attempts have been the application of water cooled plates beneath the floors of the hearths and the use of water cooling pipes embedded in the hearth floors as well as other heat exchange mediums such as cooling jackets. To my knowledge none have been successful, and, in fact, water cooled plates or embedded cooling pipes in the hearths represent such a grave potential danger in the event of molten metal breakthrough from the hearth floor that they would probably not be permitted by safety authorities.

The difficulty in utilizing the aforementioned hearth cooling means resides in the violently explosive reaction of molten metals which entrap water droplets therein, the initial confinement or entrapment of the water in some other medium such as damp soil, pipes or heating jackets contributing to the metal entrapment upon contact therewith. The principal object of the present invention is to provide a blast furnace construction with an elevated hearth wherein the hearth may be water cooled with little danger of explosion in the event of molten metal breakthrough from the hearth.

A highly important object of the invention is in the provision of a blast furnace construction having an unconfined water spray cooling means disposed spacedly below the hearth bottom for cooling the hearth.

A further object of the invention is in the provision of means for conveying water from the cooling spray from the furnace area in such a manner that the ground under the furnace will not be dampened by the water spray.

It is a further object of the invention to provide an improved furnace structure which eliminates to a great degree the danger of molten metal entrapping substantial quantities of cooling water or other cooling medium under the hearth in the event of molten metal breakthrough from the hearth.

A still further object of the invention lies in the provision of a refractory lined basin below the hearth of the blast furnace as an added safety feature in the event of a metal breakout.

Figure 2:
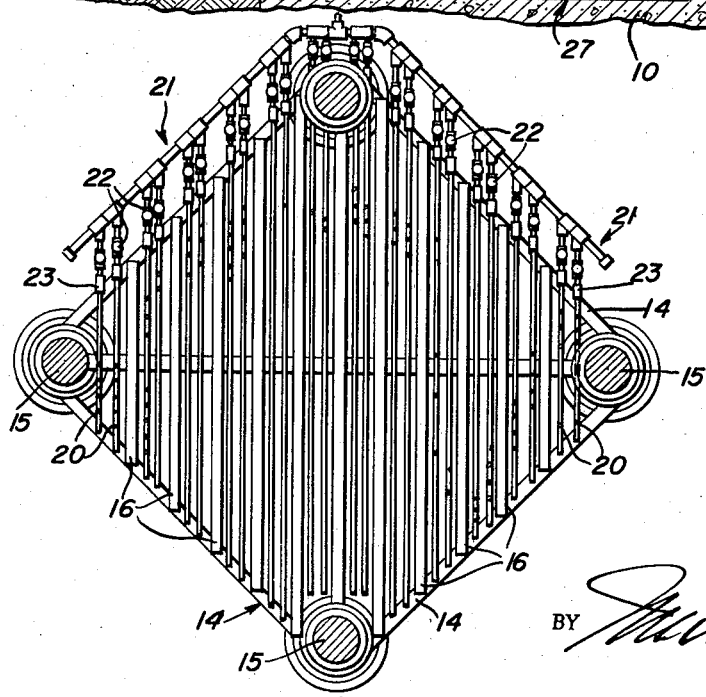

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Figure 1 is a fragmentary central vertical sectional view of a blast furnace constructed in accordance with the invention; and Figure 2 is an enlarged transverse sectional view taken on line 2—2 of Fig. 1.

Referring to the drawings, the furnace 1 comprises a conventional metal sheath 2, lined with refractory brick 3 and having peripherally disposed tuyeres 4 in its lower portion at the hearth line. The metal sheath 2 is preferably extended downwardly as indicated by numeral 5 to surround the bosh and hearth which are also lined with refractory. The furnace hearth is provided with the usual openings or notches 6 and 7 for removing cinders and the processed molten iron, respectively.

The hearth 8 may be formed of carbon or other refractory material and is in my improved structure supported on a heat conducting metal armor plate 9 which may be integrally formed from or attached to the furnace sheath 2 at the bottom of its lower end 5.

In accordance with my invention, the furnace is supported in an elevated position on concrete foundation 10 which may be situated under and close to the casthouse floor, not shown, or may be sunk a considerable distance therebelow. The means of support illustrated, comprise a plurality of metal columns 12 protected by outer, surrounding shells 13 of refractory material and resting on upstanding concrete posts 11. Supported on columns 12 are beams 14. The beams 14 in turn support metal columns 15 which may also, if desired, be supplied with protective outer sheaths of refractory material. The furnace 1 is supported by nesting the annular shoulder 46, formed at the bosh line, on the upper surfaces of columns 15. In addition, the hearth of the furnace and its protective plate 9 are seated on a series of parallel beams 16 which are laid across the support beams 14, and secured to them in any suitable manner. The net result being an elevated hearth which is open underneath to the atmosphere surrounding the furnace.

The side walls of the hearth 8 are cooled by water spray from a number of pipes 17, which surround the hearth and which may be mounted in any convenient manner. Cooling of the side walls in this fashion is not novel and therefore the details of construction are omitted from the drawings. To cool the bottom of the hearth, I provide, in each of the spaces between the parallel supporting beams 16, a pair of pipes 18 and 19 having spray orifices or nozzles 20. Pipes 18 and 19 are fed water from a header pipe 21, and each is provided with a cut-off valve 22 and a coupling 23 which enables separation and removal for repair or cleaning. The pipes 18 and 19 may be laid across beams 14 for support, or may be additionally supported by clamps attached to beams 16 or by other means not shown.

A shed 24, of metal plate or other non-absorbent material and of conical shape, is disposed below the spray pipes 18 and 19. The shed is provided with a short upstanding circular wall 25 to catch water and one or more discharge pipes 26 to direct the flow of the spent cooling water away from the area below the furnace hearth. The water shed 24 is seated on a basin 27 which may be constructed of concrete having an inner lining 28 of refractory brick.

During operation of the furnace, the entire under surface of the hearth is subjected to a fine spray of an unconfined cooling fluid such as water from the orifices in pipes 18 and 19. This is an efficient means for maintaining the bottom of the hearth at a desired lower temperature so as to increase its life to lengthen the operating period between repairs, and to materially lessen the danger of molten metal breaking through the bottom of the hearth.

Further, the water shed maintains the area beneath the hearth relatively dry and free from highly porous surfaces which could initially collect small water droplets which could become entrapped in molten metal striking the surface due to lack of free space in which to dissipate.

The cooling medium, being in the form of an unconfined free spray due to the elevated hearth positioning, not only, therefore, provides an efficient heat transfer means to prevent overheating of the hearth, but additionally provides an exceptionally safe method for water cooling the hearth since no confined water is present capable of metal entrapment because of lack of dissipating area. Furthermore, the spray pipes being supplied with individual feeds through valves 22, may be shut off in the area or areas adjacent a break-out while the remaining sprays continue to provide a coolant to the hearth bottom. This further lessens the danger of a violent explosion by limiting the amount of water in the area directly under and adjacent the cut-through. It will also be noted that the water in pipes 18 and 19 would be unconfined in case of the liquid metal striking the pipes and melting them, so that such water would not be subject to entrapment in large amounts, capable of violently exploding, but would instead either discharge as water over shed 24 or escape downwardly and outwardly as expanded steam before entrapment could occur.

As an added safety feature, should a cut-through occur from the bottom of the hearth, the lined basin 27 serves to catch the molten metal and contain it without damage to the furnace supporting columns 12 or surrounding property or human life. Preferably the basin is constructed large enough to hold a substantial portion or even all of the contents of the furnace. It should be understood, however, that the provision of a basin is optional for additional safety and that the means described for spray cooling the under side of the hearth may be used for this purpose to accomplish improved results without necessarily also using a basin.

Although a certain specific embodiment of the invention has been shown and described, it is obvious that many modifications thereof are possible. The invention, therefore, is not to be restricted except in so far as is necessitated by the prior art and by the spirit of the appended claims.

Having thus described and illustrated my invention, what I claim as new and desire to secure by Letters Patent is:

1. A blast furnace comprising a hearth having a lining at the bottom, a metal plate supporting said lining, means supporting said plate in elevated relation to the furnace supporting surface with an unconfined area open to atmosphere below the bottom of said plate for receiving liquid slag and metal in the event of a break out through the hearth, unconfined means disposed under said plate for spraying its undersurface with a cooling fluid, and a shed below said spray means to catch and direct the cooling fluid away from under said hearth.

2. A furnace as described in claim 1, wherein said spraying means comprises a series of pipes disposed below and spaced from said plate, said pipes being provided with spray orifices.

3. A furnace as described in claim 2, wherein said pipes are disposed in pairs, each of said pipes being provided with a shut-off valve, and each being separately removable.

4. A furnace as described in claim 1, wherein said shed is provided with a conically shaped surface to rapidly drain said fluid from under said hearth.

5. A blast furnace as described in claim 1, wherein a basin is provided below said hearth and under said shed, said basin having a refractory brick lining whereby to contain molten metal in the event of breakthrough thereof through said hearth, metal plate and shed.

6. In a metallurgical blast furnace, means supporting the furnace hearth in elevated relation to the furnace supporting surface and providing an unconfined area below the bottom of the hearth for receiving liquid slag and metal in the event of a break out through the hearth, means spaced from said hearth for spraying a cooling fluid on the bottom of the hearth through said unconfined area, and a shed below said spray means to catch and direct the cooling fluid away from under said hearth.

7. In a metallurgical blast furnace, means supporting the furnace hearth in elevated relation to the furnace supporting surface and providing an unconfined area below the bottom of the hearth for receiving liquid slag and metal in the event of a break out through the hearth, means spaced from said hearth for spraying a cooling fluid on the bottom of the hearth through said unconfined area, said supporting means comprising spaced columns upon which the furnace rests, said columns having open spaces therebetween providing said unconfined area, and a shed below said spray means to catch and direct the cooling fluid away from under said hearth.

8. In a metallurgical blast furnace, means supporting the furnace hearth in elevated relation to the furnace supporting surface and providing an unconfined area below the bottom of the hearth for receiving liquid slag and metal in the event of a break out through the hearth, means spaced from said hearth for spraying a cooling fluid on the bottom of the hearth through said unconfined area, said spray means comprising spray nozzles carried by cooling fluid supply conduits disposed beneath the hearth in said unconfined area, and a shed below said spray means to catch and direct the cooling fluid away from under said hearth..

9. In a metallurgical blast furnace, means supporting the furnace hearth in elevated relation to the furnace supporting surface and providing an unconfined area below the bottom of the hearth for receiving liquid slag and metal in the event of a break out through the hearth, means spaced from said hearth for spraying a cooling fluid on the bottom of the hearth through said unconfined area, said supporting means comprising spaced columns upon which the furnace rests, said columns having open spaces therebetween providing said unconfined area, said spray means comprising spray nozzles carried by cooling fluid supply conduits disposed beneath the hearth in said unconfined area, and a shed below said spray means to catch and direct the cooling fluid away from under said hearth.

(References on following page)

References Cited in the file of this patent

UNITED STATES PATENTS

| | | |
|---|---|---|
| 432,281 | Nenninger | July 15, 1890 |
| 1,703,814 | Coutant | Feb. 26, 1929 |
| 1,774,333 | Laist | Aug. 26, 1930 |
| 2,374,749 | Howard | May 1, 1945 |
| 2,513,011 | Duarte | June 27, 1950 |

FOREIGN PATENTS

| | | |
|---|---|---|
| 11,297 | Great Britain | 1903 |
| 280,043 | Germany | Nov. 4, 1914 |

OTHER REFERENCES

The Making, Shaping and Treating of Steel, 6th ed., pp. 282–351, 1951.